(12) United States Patent
Prasse et al.

(10) Patent No.: US 10,647,822 B2
(45) Date of Patent: May 12, 2020

(54) PROCESS FOR PREPARING ORGANOSILICON COMPOUNDS CONTAINING ORGANYLOXY GROUPS

(71) Applicant: Wacker Chemie AG, Munich (DE)

(72) Inventors: Marko Prasse, Glaubitz (DE); Detlev Ostendorf, Dresden (DE)

(73) Assignee: WACKER CHEMIE AG, Munich (DE)

( * ) Notice: Subject to any disclaimer, the term of this patent is extended or adjusted under 35 U.S.C. 154(b) by 111 days.

(21) Appl. No.: 15/742,402

(22) PCT Filed: Aug. 24, 2016

(86) PCT No.: PCT/EP2016/070022
§ 371 (c)(1),
(2) Date: Jan. 5, 2018

(87) PCT Pub. No.: WO2017/036892
PCT Pub. Date: Mar. 9, 2017

(65) Prior Publication Data
US 2018/0194902 A1    Jul. 12, 2018

(30) Foreign Application Priority Data
Aug. 31, 2015    (DE) ........................ 10 2015 216 598

(51) Int. Cl.
C08G 77/08    (2006.01)
C08K 5/31    (2006.01)
C08K 5/5317    (2006.01)
C08L 83/04    (2006.01)
C08G 77/18    (2006.01)
C08G 77/38    (2006.01)
C08K 5/5419    (2006.01)
C08K 5/5425    (2006.01)
C08K 5/29    (2006.01)
C08J 3/24    (2006.01)
C08K 3/26    (2006.01)
C08G 77/16    (2006.01)

(52) U.S. Cl.
CPC ............ *C08G 77/08* (2013.01); *C08G 77/18* (2013.01); *C08G 77/38* (2013.01); *C08J 3/24* (2013.01); *C08K 3/26* (2013.01); *C08K 5/29* (2013.01); *C08K 5/31* (2013.01); *C08K 5/5317* (2013.01); *C08K 5/5419* (2013.01); *C08K 5/5425* (2013.01); *C08L 83/04* (2013.01); *C08G 77/16* (2013.01); *C08K 2003/265* (2013.01)

(58) Field of Classification Search
CPC .. C08L 83/04; C08L 83/06; C08K 5/51–5373
See application file for complete search history.

(56) References Cited

U.S. PATENT DOCUMENTS

| | | | |
|---|---|---|---|
| 3,151,099 A | 9/1964 | Rhone-Poulenc | |
| 4,147,855 A * | 4/1979 | Schiller | C08L 71/02 528/23 |
| 4,745,144 A * | 5/1988 | Itoh | C08K 5/0091 524/123 |
| 5,079,324 A | 1/1992 | Cocco et al. | |
| 5,728,794 A * | 3/1998 | Friebe | C08G 77/08 528/23 |
| 6,663,269 B1 * | 12/2003 | Leu | B60Q 1/2688 362/459 |
| 7,049,384 B1 | 5/2006 | Friebe et al. | |
| 7,960,577 B2 | 6/2011 | Prasse | |
| 2004/0122197 A1 * | 6/2004 | Putzer | C08K 5/34924 528/17 |
| 2007/0123640 A1 * | 5/2007 | Cross | C08G 77/20 524/588 |
| 2011/0046299 A1 | 2/2011 | Maliverney et al. | |

FOREIGN PATENT DOCUMENTS

| | | |
|---|---|---|
| EP | 0813570 B1 | 8/2002 |
| EP | 1448695 B1 | 1/2007 |
| EP | 1964872 B1 | 10/2009 |
| GB | 2144758 A1 | 3/1985 |
| JP | H02182728 A | 7/1990 |
| WO | 0004923 A1 | 2/2000 |

* cited by examiner

Primary Examiner — Marc S Zimmer
(74) Attorney, Agent, or Firm — Brooks Kushman P.C.

(57) ABSTRACT

Synthesis of organyloxyfunctional organosilicon compounds is facilitated by a two-step process using a basic lithium, guanidine or amidine catalyst in the first step, and a phosphorus compound having a P=O linkage in a second step.

7 Claims, No Drawings

PROCESS FOR PREPARING ORGANOSILICON COMPOUNDS CONTAINING ORGANYLOXY GROUPS

CROSS REFERENCE TO RELATED APPLICATIONS

This application is the U.S. National Phase of PCT Appln. No. PCT/EP2016/070022 filed Aug. 24, 2016, which claims priority to German Application No. 10 2015 216 598.1 filed Aug. 31, 2015, the disclosures of which are incorporated in their entirety by reference herein.

BACKGROUND OF THE INVENTION

1. Field of the Invention

The present invention relates to organosilicon compounds having organyloxy groups, to a process for production of these compounds, and to the production of compositions, known as RTV-1 compositions, which can be crosslinked at room temperature with elimination of alcohols to give elastomers, using the compounds.

2. Description of the Related Art

Processes for the production of compositions that are crosslinkable by exposure to water at room temperature have been known for a long time. These compositions typically in essence comprise organopolysiloxanes having at least two hydrolyzable moieties, for example alkoxy groups, crosslinking agents having at least three hydrolyzable moieties, for example alkoxy groups, and catalysts, for example organotin compounds or organotitanium compounds. The terminally blocked siloxanes used as main polymers are produced by what is known as "endcapping".

Endcapping is essential for the production of RTV-1 compositions that can be crosslinked with elimination of alcohols. The endcapping can be carried out in various ways, and for reasons of cost-effectiveness, it is often necessary to accelerate the endcapping reaction by using catalysts. Reference may be made to EP-B-1 107 788 and EP-B-1 964 872 in relation to the use of suitable catalyst systems, and also the disadvantages mentioned in those references of the endcapping processes described: the reaction times are mostly very long, and it is therefore necessary to use temperatures higher than the temperatures usually arising during the production of the mixture; an additional operation is moreover required for deactivating and/or removing the acids or bases used and/or the required high concentrations of catalyst; many systems are susceptible to yellowing or are stable only in certain formulations.

U.S. Pat. No. 3,151,099 uses organyltitanium compounds as catalysts for the production of siloxane bonds from silanol and alkoxysil(ox)anes; GB-A-2 144 758 indicates another possibility of the catalysis of the endcapping reaction with aluminum chelate compounds. The disadvantage of the use of aluminum catalysts or titanium catalysts for the endcapping reaction is that during endcapping they bring about gelling, attended by a severe increase in the viscosity of the polymer mixture. EP-B-1 107 788 describes a method for viscosity reduction where methanol is added during the endcapping reaction with tetraalkyl titanate after the onset of gelling and the associated viscosity increase. However, that process requires long endcapping times under normal conditions, i.e. room temperature and atmospheric pressure; the undesired viscosity increase is moreover not prevented, and that process therefore does not offer any practicable solution for production-scale use.

EP-B-1 964 872 describes the combination of zinc chelate with basic nitrogen compounds or alcohol as an endcapping-catalyst system for the production of alkoxy-terminated polydimethyl-siloxanes at room temperature. That process, firstly, has the disadvantage of requiring, for the catalysis of the endcapping reaction, an additional raw material in the form of a heavy metal compound that is hazardous to health; and secondly, the time required for the endcapping reaction is too long, making that process uneconomical for production-scale use.

US-A-2011/0 046 299 uses a solution of lithium hydroxide in methanol as an endcapping catalyst, and describes silyl-substituted guanidines as catalysts for the crosslinking reaction. However, these systems have the disadvantage that the unvulcanized pastes have short shelf life, in particular at relatively high temperature.

EP-B-0 813 570 describes in-situ endcapping with orthophosphoric esters and/or polyphosphoric esters in conjunction with calcium carbonate. EP-B-1 448 695 describes stabilization and improved shelflife of RTV-1 compositions from the use of a phosphorus compound having a P=O group, where this compound has coordinative linkage by way of its P=O group to a tin compound, as a catalyst. However, no bases are used there for the production of organosilicon compounds having organyloxy groups.

SUMMARY OF THE INVENTION

The invention provides a process for the production of compositions comprising organosilicon compounds having organyloxy groups, characterized in that in a first step an organosilicon compound (E) having at least one silanol group is mixed with a compound (B) comprising at least two organyloxy groups, in the presence of a base (C1) selected from guanidines, amidines and lithium-containing bases, and the mixture is allowed to react, and in a second step a phosphorus compound (C3) having a P=O group is admixed with the resultant reaction mixture.

DETAILED DESCRIPTION OF THE PREFERRED EMBODIMENTS

The organosilicon compound (E) having silanol groups is preferably selected from those comprising units of the formula $$R_a(OH)_b SiO_{(4-a-b)/2} \quad (I),$$

where

R are identical or different SiC-bonded, optionally substituted hydrocarbon moieties, a is 0, 1, 2 or 3, preferably 1 or 2 and b is 0, 1 or 2, preferably 0 or 1, with the proviso that the sum a+b≤4 and at least one unit of the formula (I) where b is different from 0 is present.

The organosilicon compounds (E) can be selected either from silanes, i.e. compounds of the formula (I) where a+b=4, or from siloxanes, i.e. compounds comprising units of the formula (I) where a+b≤3. It is preferable that the organosilicon compounds used in the invention are selected from organopolysiloxanes, in particular from those composed of units of the formula (I).

For the purposes of the present invention, the term organopolysiloxanes is intended to include polymeric, oligomeric and also dimeric siloxanes.

Examples of R are alkyl moieties such as the methyl, ethyl, n-propyl, isopropyl, 1-n-butyl, 2-n-butyl, isobutyl, tert-butyl, n-pentyl, isopentyl, neopentyl, and tert-pentyl moieties; hexyl moieties such as the n-hexyl moiety; heptyl moieties such as the n-heptyl moiety; octyl moieties such as the n-octyl moiety and isooctyl moieties such as the 2,2,4-trimethylpentyl moiety; nonyl moieties such as the n-nonyl moiety; decyl moieties such as the n-decyl moiety; dodecyl moieties such as the n-dodecyl moiety; octadecyl moieties such as the n-octadecyl moiety; cycloalkyl moieties such as the cyclopentyl, cyclohexyl, cycloheptyl and methylcyclohexyl moieties; alkenyl moieties such as the vinyl, 1-propenyl and 2-propenyl moieties; aryl moieties such as the phenyl, naphthyl, anthryl, and phenanthryl moieties; alkaryl moieties such as o-, m-, p-tolyl moieties, xylyl moieties and ethylphenyl moieties; and aralkyl moieties such as the benzyl moiety and the α- and the β-phenylethyl moieties.

Examples of substituted moieties R are haloalkyl moieties, for example the 3,3,3-trifluoro-n-propyl moiety, the 2,2,2,2',2',2'-hexafluoroisopropyl moiety, and the heptafluoroisopropyl moiety, and haloaryl moieties, for example the o-, m- and p-chlorophenyl moieties; and also gamma-functionalized propyl moieties, for example the 3-aminopropyl moiety, 3-(2-aminoethyl)aminopropyl moiety, 3-glycidoxypropyl moiety, 3-mercaptopropyl moiety and 3-methacryloxypropyl moiety.

It is preferable that moiety R is selected from hydrocarbon moieties having from 1 to 18 carbon atoms which optionally are substituted by halogen atoms, by amino groups, by ether groups, by ester groups, by epoxy groups, by mercapto groups, by cyano groups or by (poly)glycol moieties, where the latter are composed of oxyethylene units and/or of oxypropylene units. It is particularly preferable that moiety R is selected from hydrocarbon moieties having from 1 to 8 carbon atoms, in particular, the methyl moiety.

It is preferable that organosilicon compound (E) is selected from organosilicon compounds having at least two silanol groups.

It is preferable that organosilicon compound (E) is selected from organopolysiloxanes that are in essence linear.

The dynamic viscosity of the polymers of the formula (I) used in the invention is preferably from $10^2$ to $10^3$ mPa·s, more preferably from 1000 to 350,000 mPa·s, in each case at 25° C.

Examples of organosilicon compounds (E) used in the invention are $HO(Si(CH_3)_2O)_{29-1000}Si(CH_3)_2(CH_2)_3NH_2$,
$HO(Si(CH_3)_2O)_{29-1000}Si(CH_3)_2(OH)$,
$HO(Si(CH_3)_2O)_{29-1000}Si(CH_3)_3$,
$HO(Si(CH_3)_2O)_{0-100}Si(CH_3)_2(CH_2)_3O(CH_2CH(CH_3)O)_{10-1000}(CH_2)_3(Si(CH_3)_2O)_{0-100}Si(CH_3)_2(OH)$,
$HO(Si(CH_3)_2O)_{3-500}Si[O(Si(CH_3)_2O)_{3-500}H]_3$ and
$HO(Si(CH_3)_2O)_{3-500}Si(CH_3)[O(Si(CH_3)_2O)_{3-500}H]_2$, preference being given here to $HO(Si(CH_3)_2O)_{30-1000}Si(CH_3)_2(OH)$.

Component (E) is commercially available or can be produced by familiar chemical processes.

The compound (B) having organyloxy groups is preferably selected from those comprising units of the formula

 (II), where
$R^1$ are identical or different SiC-bonded hydrocarbon moieties, $R^2$ can be identical or different and is a hydrocarbon moiety which can be interrupted by oxygen atoms,
c is 0, 1, 2 or 3,
d is 0, 1, 2, 3 or 4 and
e is 0 or 1' preferably 0,
with the proviso that the sum c+d+e≤4 and at least two —$OR^2$ moieties are present per molecule.

It is preferable that compound (B) is selected from organosilicon compounds having at least three organyloxy groups.

The compounds (B) used in the invention can be selected either from silanes, i.e. compounds of the formula (II) where c+d+e=4, or from siloxanes, i.e. compounds comprising units of the formula (II) where c+d+e≤3. It is preferable that the compounds (B) used in the invention are selected from compounds of the formula (II), where d is preferably 3 or 4.

Examples of moieties $R^1$ are the examples of hydrocarbon moieties given for moiety R.

It is preferable that moiety $R^1$ is selected from the methyl, ethyl, n-propyl, isopropyl, 1-n-butyl, 2-n-butyl, isobutyl, tert-butyl, phenyl and vinyl moieties, particular preference being given to methyl and vinyl moieties.

Examples of moieties $R^2$ are the examples of hydrocarbon moieties given for moiety R.

It is preferable that moiety $R^2$ is selected from the methyl, ethyl and isopropyl moieties, more preferably the methyl and the ethyl moieties, and in particular, the methyl moiety.

Examples of compound (B) used in the invention are methyltrimethoxysilane, dimethyldimethoxysilane, tetramethoxysilane, vinyltrimethoxysilane, methylvinyldimethoxysilane, methyltriethoxysilane, tetraethoxysilane, phenyltrimethoxysilane, n-butyl-trimethoxysilane, isobutyltrimethoxysilane and tert-butyltrimethoxysilane, and also partial hydrolyzates of these, preference being given to methyltrimethoxysilane, tetramethoxysilane, vinyltrimethoxysilane, methylvinyldimethoxysilane, methyltriethoxysilane, tetraethoxysilane or n-butyltrimethoxysilane, and particular preference being given to methyltrimethoxysilane, tetramethoxysilane, vinyltrimethoxysilane, tetraethoxysilane or n-butyltrimethoxysilane.

Component (B) is commercially available or can be produced by familiar chemical processes.

Molar quantities of the component (B) used in the process of the invention are preferably 2 to 100, more preferably from 5 to 50, based in each case on 1 mol of Si-bonded OH groups in the compound (E).

The bases (C1) used in the invention are preferably selected from those with a pH at least 11.0, more preferably at least 12.0. The pH is measured in 0.05 M solution in a mixture of 10 parts by weight of ethanol and 3 parts by weight of water at 20° C. and at the pressure of the ambient atmosphere, preferably 1013 hPa, with a SevenCompact S220 pH meter from Mettler Toledo in Schwerzenbach, Switzerland, and an InLab® Expert Pro ISM pH electrode.

It is preferable that the guanidines (C1) which are optionally used in the invention are selected from those of the formula

 (III)

where $R^3$, $R^4$, $R^5$, $R^6$ and $R^7$ are respectively, and mutually independently, a hydrogen atom or an optionally substituted hydrocarbon moiety.

It is preferable that the amidines (C1) optionally used in the invention are selected from those of the formula

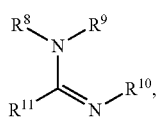

(IV)

where $R^8$, $R^9$, $R^{10}$ and $R^{11}$ are respectively, and mutually independently, a hydrogen atom or optionally substituted hydrocarbon moiety.

Examples of hydrocarbon moieties $R^3$, $R^4$, $R^5$, $R^7$, $R^8$, $R^9$, $R^{10}$ and $R^{11}$ are respectively, and mutually independently, a hydrogen atom and the examples given for moiety R. If $R^3$, $R^4$, $R^5$, $R^7$, $R^8$, $R^9$, $R^{10}$ and $R^{11}$ are selected from substituted hydrocarbon moieties, preference is given to the following substituents, respectively, and mutually independently: halogen atoms, amino groups, ether groups, ester groups, epoxy groups, mercapto groups, cyano groups or (poly)glycol moieties, where the latter are composed of oxyethylene units and/or oxypropylene units.

Although the formulae (III) and (IV) do not show this, it is also possible that two or more moieties $R^3$, $R^4$, $R^5$, $R^6$ and $R^7$ and, respectively, $R^8$, $R^9$, $R^{10}$ and $R^{11}$ together represent a di- or polyfunctional, optionally substituted hydrocarbon moiety having from 2 to 8 carbon atoms.

If the di- or polyfunctional hydrocarbon moieties are selected from heteroatom-substituted hydrocarbon moieties, the heteroatom is preferably oxygen, hydrogen or sulfur, most preferably nitrogen or oxygen. The hydrocarbon moiety can also comprise a plurality of heteroatoms. By way of example, it is possible that $R^4$ and $R^5$, $R^3$ and $R^7$, $R^9$ and $R^{10}$ together form a ring, as in azolidine, azinane, 1,3-diazinane, azepane, 1,4,5,6-tetrahydropyrimidine, 4,5-dihydro-1H-imidazole, imidazole, imidazolidine, azocane, 1,3-diazepane or 4,5,6,7-tetrahydro-1H-1,3-diazepine.

It is preferable that the moieties $R^3$, $R^4$, $R^5$ and $R^7$ are selected from hydrogen, phenyl groups, butyl groups or methyl groups or propylene groups insofar as two of the moieties mentioned together form a ring, particularly from hydrogen or methyl groups or propylene groups insofar as two of the moieties mentioned together form a ring.

Hydrocarbon moiety $R^6$ is preferably selected from hydrogen or hydrocarbon moieties having from 1 to 18 carbon atoms which optionally are substituted by hydroxy groups, by halogen atoms, by amino groups, by ether groups, by ester groups, by epoxy groups, by mercapto groups, by cyano groups or by (poly)glycol moieties, where the latter are composed of oxyethylene units and/or of oxypropylene units.

It is preferable that the moieties $R^9$ and $R^{10}$ are selected from hydrogen, methyl groups or optionally substituted difunctional hydrocarbon moieties, where the moieties $R^9$ and $R^{10}$ together can form a ring, and it is most preferable that they are selected from difunctional hydrocarbon moieties, for example the propylene moiety, where moiety $R^9$ and $R^{10}$ form a ring.

It is preferable that the moieties $R^8$ and $R^{11}$ are selected from hydrogen, methyl groups or optionally substituted difunctional hydrocarbon moieties, where the individual moieties can together form a ring, and it is particularly preferable that they are selected from hydrogen or difunctional hydrocarbon moieties, where the individual moieties together can form a ring.

It is preferable that the guanidines (C1) are selected from 1,5,7-triazabicyclo[4.4.0]dec-5-ene, 7-methyl-1,5,7-triazabicyclo[4.4.0]dec-5-ene, 1-n-butylguanidine, 1,3-diphenylguanidine and N,N,N',N'-tetramethylguanidine, particularly 1,5,7-triazabicyclo[4.4.0]dec-5-ene and 7-methyl-1,5,7-triazabicyclo[4.4.0]dec-5-ene, in particular 1,5,7-triazabicyclo[4.4.0]dec-5-ene.

It is preferable that the amidines (C1) are selected from 1,2-dimethyl-1,4,5,6-tetrahydropyrimidine, 1,4,5,6-tetrahydropyrimidine, 1,8-diazabicyclo[5.4.0]undec-7-ene (DBU) and 1,5-diazabicyclo[4.3.0]non-5-ene (DBN), particularly 1,8-diazabicyclo[5.4.0]undec-7-ene and 1,5-diazabicyclo[4.3.0]non-5-ene.

The lithium-containing bases (C1) optionally used in the invention can be selected from lithium hydroxide, lithium hydride, lithium nitride, lithium amide, lithium imide, organolithium compounds, for example butyllithium or lithium alcoholates, or else lithium-containing organosilicon compounds, for example lithium silanolate, obtainable for example by reaction of lithium hydroxide with siloxanes or with silanes, or can be selected from the mixtures of these.

It is preferable that the lithium-containing bases (C1) optionally used in the invention are selected from lithium hydroxide, lithium methanolate, lithium hydride, lithium nitride, lithium isopropylamide, n-butyllithium, lithium ethanolate or from mixtures of these.

Bases (C1) used in the invention are products which are commercially available or which can be produced by familiar chemical processes.

It is preferable that (C1) is selected from guanidines, particularly guanidines of the formula (III), in particular 1,5,7-triazabicyclo[4.4.0]dec-5-ene.

In order to facilitate handling, the bases (C1) used in the invention can, in particular if they are in the solid state, be mixed with a diluent.

Suitable diluents are any of the substances which are useful for the dilution of bases, for example substances with melting points below 20° C. at 1000 hPa. It is preferable to use component (B) and/or organic solvent (D) as diluent.

Solvents (D) can be any desired substances with melting points below 20° C. at 1000 hPa, preferably those which do not impair the action of the base (C1).

Examples of organic solvents (D) are alcohols, for example methanol, ethanol, n-propanol, isopropanol, n-amyl alcohol, isoamyl alcohol, 1,3-propanediol, 2-methyl-1,3-propanediol, dipropylene glycol, dipropylene glycol monomethyl ether, 3-methoxy-3-methyl-1-butanol, Texanol; ethers, for example dioxane, tetrahydrofuran, diethyl ether, diisopropyl ether, diethylene glycol dimethyl ether; chlorinated hydrocarbons, for example dichloromethane, trichloromethane, tetrachloromethane, 1,2-dichloroethane, trichloroethylene; hydrocarbons, for example pentane, n-hexane, hexane isomer mixtures, heptane, octane, drycleaners' gasoline, petroleum ether, benzene, toluene, xylenes; ketones, for example acetone, methyl ethyl ketone, diisopropyl ketone, methyl isobutyl ketone (MIBK); esters, for example ethyl acetate, butyl acetate, propyl propionate, ethyl butyrate, ethyl isobutyrate; acetals, for example dioxolane, butylal, 2,5,7,10-tetraoxaundecane; and pyrrolidones, for example 1-cyclohexyl-2-pyrrolidone, nitriles, for example acetonitrile, and mixtures of these solvents.

If organic solvents (D) are used in the invention, they are preferably selected from monohydric and dihydric alcohols, particularly methanol or ethanol, in particular methanol.

Base (C1) is preferably used in a mixture with diluent in the process of the invention, and it is then preferable to use from 1 to 2000 parts by weight, more preferably from 50 to 1000 parts by weight, of diluent, based in each case on one part by weight of base (C1).

Quantifies of base (C1) preferably used in the process of the invention are from 1 to 2000 ppm by weight, more preferably from 10 to 1000 ppm by weight, and in particular from 50 to 500 ppm by weight, based in each case on the total weight of component (E).

The phosphorus compound (C3) used in the invention having a P═O group is preferably selected from phosphorus compounds of the general formula $$O=PR^{16}{}_m(OR^{17})_n(OH)_{3-(m+n)} \quad (VII),$$

where m is equal to 0 or 1, n is equal to 0, 1, 2 or 3, m+n is equal to 1, 2 or 3, $R^{16}$ is an optionally substituted hydrocarbon moiety, $R^{17}$ can be identical or different and is an optionally substituted hydrocarbon moiety which can be interrupted by heteroatoms, is a triorganosilyl moiety bonded by way of Si, is an organoalkoxysilyl moiety bonded by way of Si, or is a phosphate moiety bonded by way of P, with the proviso that if $R^{17}$ is an optionally substituted hydrocarbon moiety, m is equal to 0 and n is equal to 1 or 2, preferably 1.

Examples of optionally substituted hydrocarbon moieties, moieties $R^{16}$ and $R^{17}$, are the examples given for moiety R.

It is preferable that moiety $R^{16}$ is selected from hydrocarbon moieties having from 1 to 30 carbon atoms, more preferably hydrocarbon moieties having from 1 to 14 carbon atoms.

It is preferable that moiety $R^{17}$ is selected from hydrocarbon moieties having from 1 to 30 carbon atoms, triorganosilyl moieties or organodialkoxysilyl moieties, particularly hydrocarbon moieties having from 1 to 14 carbon atoms, alkyldialkoxysilyl moieties or alkenyldialkoxysilyl moiety.

Examples of phosphorus compounds (C3) having a P═O group are tris(trimethylsilyl)phosphate, methylphosphonic acid, n-butylphosphonic acid, n-octylphosphonic acid, mono(methyldimethoxysilyl)-n-octylphosphonate, vinylphosphonic acid, phenylphosphonic acid, mono(2-ethylhexyl)phosphate, a mixture of mono- and di(2-ethylhexyl)phosphate, mono(isodecyl) phosphate, a mixture of mono- and di(isononyl)phosphate, trimethylsilyl di(2-ethylhexyl)phosphate and bis(trimethylsilyl) mono(2-ethylhexyl) phosphate.

It is most preferable that the phosphorus compound (C3) (C3) used in the invention having a P═O group is selected from phosphonic acids, monoesters of phosphoric acid, silyl esters of phosphonic acid or silyl esters of phosphoric acid.

The phosphorus compounds (C3) of the invention having a P═O group are compounds which are commercially available or can be produced by familiar chemical processes.

In order to facilitate handling, the phosphorus compounds (3) used in the invention having a P═O group can, in particular if they are in the solid state, be mixed with a diluent.

Suitable diluents are any of the substances which could be used hitherto for the dilution of compounds having a P═O group, for example substances with melting point below 20° C. at 1000 hPa, and it is preferable to use component (B) or organic solvent (D) as diluent(s). The diluent for component (C3) is preferably selected independently of the selection of the diluent for component (C1).

Compound (C3) is preferably used in a mixture with diluent in the process of the invention, quantities of diluent preferably being from 0.1 to 10 parts by weight, more preferably from 0.5 to 5 parts by weight, based in each case on one part by weight of compound (C3).

Quantities of component (C3) are preferably from 0.01 to 5.0 parts by weight, more preferably from 0.05 to 3.0 parts by weight, and in particular from 0.1 to 2.0 parts by weight, based in each case on 100 parts by weight of the quantity of component (E) used in the first step.

It is preferable that the process of the invention is a process for the production of compositions that are crosslinkable by condensation reactions, where additional components can be used.

It is then possible in the process of the invention to use, in addition to the components (B), (C1), (C3), (D) and (E) described, any of the substances which are useful in compositions that are crosslinkable by a condensation reaction, for example metal-containing condensation catalysts (F), calcium carbonate (G), other fillers (G1), plasticizers (H) and other constituents (I).

Catalyst (F) used in the invention can be selected from commercially available products or those that can be produced by familiar chemical processes. Examples of the catalysts (F) optionally used in the invention are titanium compounds, for example tetra-n-propoxyorthotitanate, tetra-isopropoxyorthotitanate, tetra-n-butylorthotitanate, tetra-isobutyl orthotitanate, tetra-tert-butylorthotitanate and bis(ethylacetoacetato)diisobutoxytitanium; and also organotin compounds, for example dimethyltin diacetate, dimethyltin oxide, dimethyltin dilaurate, di-n-butyltin dilaurate, di-n-butyltin diacetate, di-n-butyltin oxide, di-n-butyltin dineodecanoate, di-n-butyltin diacetylacetonate, di-n-butyltin maleate, di-n-octyltin diacetate, di-n-octyltin dilaurate, di-n-octyltin oxide, di-n-octyltin maleate, di-n-octyltin di(2-ethyl)hexanoate, di-n-octyltin neodecanoate, di-n-octyltin-isodecanoate, partial hydrolyzates of these and reaction products of these compounds or partial hydrolyzates with alkoxysilanes, for example tetraethoxysilane, methyltriethoxysilane, methyltrimethoxysilane, propyltrimethoxysilane, 3-aminopropyltrimethoxysilane, 3-aminopropyltriethoxysilane, 2-aminoethyl-3-aminopropyltrimethoxysilane, 2-aminoethyl-3-aminopropyltrimethoxysilane or condensation or cocondensation products of these, and esters, for example diisodecyl phthalate, di-n-octyl phthalate, or diisodecyl phthalate.

It is preferable that component (F) is selected from titanium chelates, tetra-tert-butylorthotitanate and reaction products of dimethyltin diacetate, dimethyltin oxide, di-n-butyltin diacetate, di-n-butyltin oxide, di-n-octyltin diacetate or di-n-octyltin oxide with alkoxysilanes, for example tetraethoxysilane, methyltriethoxysilane, methyltrimethoxysilane, propyltrimethoxysilane, 3-aminopropyltrimethoxysilane, 3-aminopropyltriethoxysilane, 2-aminoethyl-3-aminopropyltrimethoxysilane, 2-aminoethyl-3-aminopropyltrimethoxysilane or condensation or cocondensation products of these, particularly titanium chelates and reaction products of dimethyltin oxide, di-n-butyltin oxide, or di-n-octyltin oxide with alkoxysilanes, for example tetraethoxysilane, methyltriethoxysilane, methyltrimethoxysilane, 3-aminopropyltrimethoxysilane, 3-aminopropyltriethoxysilane, 2-aminoethyl-3-aminopropyltrimethoxysilane, 2-aminoethyl-3-aminopropyltrimethoxysilane or condensation or cocondensation products of these.

When catalysts (F) are used in the process of the invention, quantities here are preferably from 0.01 to 10.0 parts by weight, more preferably from 0.01 to 5.0 parts by weight, and in particular from 0.1 to 3.0 parts by weight, based in each case on 100 parts by weight of the entire crosslinkable mixture. It is preferable to use catalyst (F).

The fillers (G) optionally used in the invention are selected from calcium carbonate, preferably ground or precipitated calcium carbonate, more preferably ground calcium carbonate from natural sources, for example limestone and marble, or precipitated calcium carbonate which has then been dried to a moisture content below 0.5% by weight. The calcium carbonate can have been treated by known processes with quantities of stearic acid that are preferably from 0.1 to 4.0% by weight, based on the quantity of the calcium carbonate to be treated. The stearic acid preferably comes from natural sources and mostly comprises other long-chain carboxylic acids having from 14 to 22 carbon atoms, alongside the stearic acid.

The median particle size (D50) of the optionally used component (G) of the invention is preferably from 0.1 to 10 μm, more preferably from 1 to 5 μm.

The stearic acid content of the optionally used component (G) of the invention is preferably from 0.5 to 1.0% by weight, more preferably from 0.7 to 0.9% by weight, and in particular about 0.8% by weight.

The moisture content of the optionally used component (G) of the invention, measured from loss in weight on drying at 110° C. and at a pressure of 1013 hPa, is preferably below 0.05% by weight.

Examples of component (G) are the products obtainable from OMYA, Cologne, Germany, with trademark OMYACARB BLR3, OMYACARB 2T-AV, OMYACARB 5-GU, OMYA BLH, OMYABOND 520-FL, OMYABOND 520-OM and OMYACARB 5T-NJ, the products Imerseal 50, Carbital 110 and Carbital 110S obtainable from Imerys Minerals GmbH, or the products PolyPlex 2 and PolyPlex 5 obtainable from Calcit d.o.o., Slovenia.

When component (G) is used in the process of the invention, quantities are preferably from 10 to 60 parts by weight, more preferably from 30 to 55 parts by weight, and in particular from 40 to 55 parts by weight, based in each case on 100 parts by weight of the entire crosslinkable mixture.

The optionally used further fillers (G1) of the invention can be any desired, fillers which are different from component (G).

Examples of further fillers (G1) are non-reinforcing fillers, i.e. fillers with BET surface area up to 50 m$^2$/g, for example quartz, diatomaceous earth, calcium silicate, zirconium silicate, zeolites, metal oxide powders, for example aluminum oxides, titanium oxides, iron oxides or zinc oxides or mixed oxides of these, barium sulfate, gypsum, silicon nitride, silicon carbide, boron nitride, glass powders and plastics powders, for example polyacrylonitrile powders; reinforcing fillers, i.e. fillers with BET surface area above 50 m$^2$/g, for example fumed silica, precipitated silica, carbon black, for example furnace black and acetylene black, and silicon-aluminum mixed oxides having large BET surface area; fibrous fillers, for example asbestos, and also synthetic fibers. The fillers mentioned can have been hydrophobized, for example by treatment with organosilanes or organosiloxanes or by etherification of hydroxy groups to give alkoxy groups. If fillers (G1) are used, preference is given to hydrophilic fumed silica.

If component (G1) of the invention is used, quantities are preferably from 1 to 80 parts by weight, more preferably from 1 to 10 parts by weight, based in each case on 100 parts by weight of the entire crosslinkable mixture. The compositions of the invention preferably comprise component (G1).

Examples of plasticizers (H) are dimethylpolysiloxanes which have end-blocking trimethylsiloxy groups and are liquid at room temperature and at a pressure of 1013 hPa, and which in particular have dynamic viscosities of in the range from 5 to 1000 mPa·s at 25° C., and also high-boiling-point hydrocarbons, for example paraffin oils or mineral oils composed of naphthenic and paraffinic units.

If component (H) of the invention is used, quantities are preferably from 1 to 50 parts by weight, more preferably from 5 to 25 parts by weight, and in particular from 10 to 20 parts by weight, based in each case on 100 parts by weight of the entire crosslinkable mixture. It is preferable to use component (H).

Examples of further constituents (I) are those that are different from component (B), selected from among crosslinking agents, for example methyl N-(trimethoxysilylmethyl) methylcarbamate, methyl N-(dimethoxymethylsilylmethyl) methylcarbamate, methyltriacetoxysilane, ethyltriacetoxysilane, propyltriacetoxysilane, di-tert-butoxydiacetoxysilane, methyltris(methylethylketoximo)silane and vinyltris(methylethylketoximo)silane, tetra-kis-(methylethylketoximo)silane, bis(N-methylbenzamido) ethoxy-methylsilane, methyltris(propenyloxy)silane, vinyltris(propenyloxy)silane, and also partial hydrolyzates of these which can optionally also be prepared by cohydrolysis; adhesion promoters, for example 3-glycidoxypropyltrimethoxysilane, 3-glycidoxypropyltriethoxysilane, 3-glycidoxypropyldimethoxymethylsilane and 3-glycidoxypropyldiethoxymethylsilane and 2-(3,4-epoxycyclohexyl)ethyltriethoxysilane; silanes and organopolysiloxanes having functional groups, for example those having 3-aminopropyl, 3-(2-aminoethyl)aminopropyl, isocyanuratopropyl, 3-ureidopropyl or 3-methacryloxypropyl moieties, 4-(triethoxysilylmethyl)tetrahydro-1,4-oxazine, 4-(trimethoxysilylmethyl)tetrahydro-1,4-oxazine, 4-(diethoxymethylsilylmethyl)tetrahydro-1,4-oxazine and 4-(dimethoxymethylsilylmethyl)tetrahydro-1,4-oxazine; pigments; dyes; fragrances; oxidation inhibitors; agents for influencing electrical properties, for example conductive carbon black; flame-retarding agents; light stabilizers; and agents to prolong skinning time, for example silanes having an SiC-bonded mercaptoalkyl moieties; cell-generating agents, e.g. azodicarbonamide; heat stabilizers; cocatalysts, for example zinc chelates, preferably anhydrous zinc chelates, for example anhydrous zinc(II) acetylacetonate; thixotropizing agents, for example polyethers; organic solvents, for example alkylaromatics; and biocides, for example fungicides, bactericides or acaricides.

If component (I) of the invention is used, it is preferably selected from adhesion promoters, silanes and organopolysiloxanes having functional groups, pigments, dyes, thixotropizing agents and fungicides.

If component (C1) used is selected from amidines or noncyclic guanidines, it can be advantageous in the first step of the process of the invention to use cocatalyst (I), particularly preferably zinc (II) chelate, in particular zinc (II) acetylacetonate.

If component (I) of the invention other than cocatalyst is used, quantities are preferably from 0.0001 to 10 parts by weight, particularly preferably from 0.001 to 10 parts by weight, based in each case on 100 parts by weight of the entire crosslinkable mixture. It is preferable to use component (I).

If, in an embodiment of the present invention, cocatalyst is used as component (I) in the invention, quantities are preferably from 1 to 1000 ppm by weight, more preferably from 10 to 500 ppm by weight, based in each case on 100 parts by weight of the quantity of component (E) used in the first step.

It is preferable in the process of the invention not to use any constituents other than components (A) to (I).

The components used in the process of the invention can respectively be one type of each component or else a mixture of two or more types of a respective component.

The individual components in the first step of the process of the invention can be mixed with one another in any desired sequence and in a manner known hitherto. It is also possible to produce premixes from some components, for example a mixture of components (C1) with (B) and/or (D), which are then mixed with the other components. Individual constituents can also be present or, respectively, introduced at the very start or during the mixing process. By way of example, it is also possible to delay addition of a portion of component (B) for 1 to 60 minutes after the mixing of the respective other constituents.

The first step of the process of the invention can use, in addition to components (B), (E), (C1) and optionally (D), further substances with the exception of component (C3), metal-containing condensation catalysts (F) and calcium carbonate (G).

The first step of the process of the invention is preferably carried out without additional heating at ambient temperatures or at the temperatures prevailing on mixing of the individual components. These are preferably temperatures of from 10 to 70° C., more preferably from 15 to 65° C. However, this process can also, if desired, take place at higher temperatures, e.g. at temperatures in the range from 35 to 135° C. The mixture can, if desired, be heated or cooled.

The first step of the process of the invention is preferably carried out at the pressure of the ambient atmosphere, i.e. from 900 to 1100 hPa; however, it is also possible to operate at superatmospheric pressure, for example at absolute pressures of from 1100 to 3000 hPa, in particular in a continuous operating mode, if by way of example, these pressures prevail in closed systems as a result of the pressure during pumping and as a result of the vapor pressure at elevated temperatures of the materials used. It is possible, if desired, to begin by degassing component (E) or a mixture of component (E), plasticizer (H) and/or other substances (I) at subatmospheric pressure, for example at an absolute pressure of from 50 to 900 mbar, and only then to add component (C1), (B) and optionally (D).

In the second step of the process of the invention, the reaction mixture obtained in the first step is mixed with component (C3), optionally in the form of premix with diluent, preferably (B) and/or (D), and also optionally with further components.

The second step of the process of the invention is preferably carried out without additional heating at ambient temperatures or at the temperatures prevailing on mixing of the individual components. These are preferably temperatures of from 10 to 100° C., more preferably from 15 to 70° C. The mixture can, if desired, be cooled.

The second step of the process of the invention is preferably carried out at the pressure of the ambient atmosphere, i.e. from 900 to 1100 hPa; however, it is also possible to operate at super atmospheric pressure, for example at absolute pressures of from 1100 to 3000 hPa, in particular in continuous operating mode if by way of example these pressures prevail in closed systems as a result of the pressure during pumping and as a result of the vapor pressure at elevated temperatures of the materials used. At the end of the second step it is possible, if desired, to degas the mixture at subatmospheric pressure, for example at an absolute pressure of from 50 to 500 mbar.

It is preferable that the second step is carried out when at least 50%, more preferably at least 70%, and in particular at least 90%, of the Si-bonded OH groups in component (E) have reacted with component (B) in the first step.

It is preferable that the second step and the first step take place in the same mixer, but the second step can, if desired, in particular in continuous operating mode, also take place at another location.

After the second step, the mixture can, if desired, be used, placed in intermediate storage, transported, or further processed in a third step, for example addition of further components. Storage can continue for various periods, from a few minutes to several years.

The inventive mixing of the individual components, both in the first step and in the second step, preferably takes place with very substantial exclusion of water from the ambient atmosphere, and this can be achieved by way of example by blanketing with dry air, preferably with a dew point below 0° C. at 1013 hPa, or with nitrogen.

The inventive mixing of the individual components, both in the first step and in the second step, can—if desired—be carried out under inert gas, for example nitrogen.

The reaction mixture in the process of the invention can, if desired be devolatilized at any desired junctures, where the devolatization is carried out by means of reduced pressure in the same apparatus or in a downstream apparatus with or without inert gas feed, at room temperatures or elevated temperatures. The volatile constituents are preferably alcohols, for example methanol or ethanol.

The process of the invention can be carried out continuously, semicontinuously or batchwise.

In a preferred embodiment of the process of the invention,
in a first step
organosilicon compound (E) having at least one silanol group, optionally in a mixture with plasticizer (H) and/or with further substances (I), is optionally degassed at an absolute pressure of from 50 to 300 mbar and aerated with dry air or nitrogen, is mixed in a mixing vessel with compound (B) comprising at least two organyloxy groups, in the presence of base (C1) selected from guanidines, amidines and lithium-containing bases, optionally in a mixture with diluent, and the mixture is allowed to react, and
in a second step
a phosphorus compound (C3) having a P=O group, optionally in a mixture with diluent, and also with at least one component selected from catalyst (F), calcium carbonate (G), filler (G1), plasticizer (H) and further substances (I) is admixed with the resultant reaction mixture, with the proviso that the second step takes place only when at least 50% of the Si—OH groups in component (E) have reacted with component (B) in the first step,
and also
in an optional third step, the mixture obtained in the second step is degassed at an absolute pressure of from 50 to 300 mbar and is aerated with dry air or nitrogen. The temperature depends on the initial temperature of the raw materials and on the process conditions, and is preferably in the range from 20 to 60° C.

In another preferred embodiment of the process of the invention, in a first step organosilicon compound (E), optionally in a mixture with plasticizer (H), is optionally degassed at an absolute pressure of from 50 to 300 mbar and aerated with dry air or nitrogen, and is mixed, in a mixing vessel, with compound (B) comprising at least two organyloxy groups in the presence of base (C1) selected from guanidines, amidines and lithium-containing bases, optionally in a mixture with diluent, and in a second step the resultant reaction mixture is mixed with a phosphorus compound (C3) having a P=O group, optionally in a mixture with diluent, with the proviso that the second step takes place only when at least 50% of the Si—OH groups in component (E) have reacted with component (B) in the first step. It is preferable that the mixing is carried out at ambient pressure before the mixture is degassed at an absolute pressure of from 10 to 300 mbar and is aerated with dry air or nitrogen. The temperature depends in essence on the initial temperature of the polymer (E), and is preferably in the range from 20 to 60° C. The mixture is then preferably drawn off into a storage tank.

In another preferred embodiment of the process of the invention, in a first step organosilicon compound (E), optionally in a mixture with plasticizer (H), is continuously mixed with, compound (B) comprising at least two organyloxy groups in the presence of base (C1) selected from guanidines, amidines and lithium-containing bases, optionally in a mixture with diluent, and the mixture is pumped into a holding section, and in a second step the resultant reaction mixture is mixed with a phosphorus compound (C3) having a P=O group, optionally in a mixture with diluent, and also with at least one component selected from catalyst (F), calcium carbonate (G), filler (G1), plasticizer (H) and further substances (I), with the proviso that the second step takes place only when at least 50% of the Si—OH groups in component (E) have reacted with component (B) in the first step. The pressure prevailing in the mixing zone and holding section is preferably from 1.0 to 5.0 bar. Once the second step has been concluded, it is preferable that the mixture is devolatilized at an absolute pressure of from 50 to 500 mbar. The temperature depends on the initial temperature of the raw materials and on the process conditions, and is preferably in the range from 30 to 80° C.; in the event that higher temperatures prevail, resulting from process conditions, the mixture is preferably cooled to temperatures below 80° C.

In another preferred embodiment of the process of the invention, in a first step organosilicon compound (E), optionally in a mixture with plasticizer (H), is continuously mixed with compound (B) comprising at least two organyloxy groups in the presence of base (C1) selected from guanidines, amidines and lithium-containing bases, optionally in a mixture with diluent, and the mixture is pumped into a holding section, and in a second step the resultant reaction mixture is mixed with a phosphorus compound (C3) having a P=O group, optionally in a mixture with diluent, with the proviso that the second step takes place only when at least 50% of the Si—OH groups in component (E) have reacted with component (B) in the first step. The prevailing pressure in the mixing zone and holding section is preferably from 1.0 to 5.0 bar. After completion of the second step, the mixture is preferably not devolatilized and drawn off into a storage tank. The temperature depends on the initial temperature of the raw materials and on the process conditions, and is preferably in the range from 30 to 80° C.; in the event that prevailing temperatures are higher as a result of process conditions, the mixture is preferably cooled to temperatures below 80° C.

In a particularly preferred embodiment of the process of the invention in a first step organosilicon compound (E), optionally in a mixture with plasticizer (H) and/or with further substances (I), is optionally degassed at an absolute pressure of from 50 to 300 mbar and aerated with dry air or nitrogen, and mixed in a paste mixer with compound (B) comprising at least two organyloxy groups in the presence of base (C1) selected from guanidines, amidines and lithium-based bases, optionally in a mixture with diluent, and after from 5 to 15 min in a second step the resultant reaction mixture is mixed with a phosphorus compound (C3) having a P=O group, optionally in a mixture with diluent, and also with at least one component selected from catalyst (F), calcium carbonate (G), filler (G1), plasticizer (H) and further substances (I). It is preferable that the mixture is degassed at an absolute pressure of from 50 to 300 mbar and aerated with dry air or nitrogen. The temperature depends on the initial temperature of the raw materials and on the process conditions, and is preferably in the range from 20 to 60° C.

In another particularly preferred embodiment of the process of the invention, in a first step organosilicon compound (E), optionally in a mixture with plasticizer (H) and/or with further substances (I), is optionally degassed at an absolute pressure of 50 to 300 mbar and aerated with dry air or nitrogen, and mixed in a paste mixer with compound (B) comprising at least two organyloxy groups in the presence of base (C1) selected from guanidines, amidines and lithium-containing bases, optionally in a mixture with diluent, and after from 5 to 15 min in a second step the resultant reaction mixture is first mixed with the catalyst (F) and then mixed with a phosphorus compound (C3) having a P=O group, optionally in a mixture with diluent, and also with at least one component selected from calcium carbonate (G), filler (G1), plasticizer (H) and further substances (I). It is preferable that the mixture is degassed at an absolute pressure of from 50 to 300 mbar and aerated with dry air or nitrogen. The temperature depends on the initial temperature of the raw materials and on the process conditions, and is preferably in the range from 20 to 60° C.

The process of the invention can produce a wide variety of organosilicon, compounds having organyloxy groups, and also compositions of these.

Examples of the organosilicon compounds produced in the invention, having organyloxy groups, are $(MeO)_2(Me)SiO(Si(CH_3)_2O)_{30-1000}Si(CH_3)_2(CH_2)_3NH_2$, $(MeO)_2(Me)SiO(Si(CH_3)_2O)_{30-1000}Si(CH_3)_2OSi(Me)(OMe)_2$, $(EtO)_2(Me)SiO(Si(CH_3)_2O)_{30-1000}Si(CH_3)_2OSi(Me)(OEt)(OMe)$, $(MeO)_2(Me)SiO(Si(CH_3)_2O)_{30-1000}Si(CH_3)_2OSi(Me)_2(OMe)$, $(MeO)_2(Vi)SiO(Si(CH_3)_2O)_{30-1000}Si(CH_3)_2OSi(Me)(OMe)_2$, (EtO)$_2$(Vi)SiO(Si(CH$_3$)$_2$O)$_{30-1000}$Si(CH$_3$)$_2$OSi(Me)(OMe)$_2$, (MeO)$_2$(Vi)SiO(Si(CH$_3$)$_2$O)$_{30-1000}$Si(CH$_3$)$_2$OSi(Vi)(OMe)$_2$, (EtO)$_2$(Vi)SiO(Si(CH$_3$)$_2$O)$_{30-1000}$Si(CH$_3$)$_2$OSi(Vi)(OEt)$_2$, (MeO)$_2$(Me)SiO(Si(CH$_3$)$_2$O)$_{30-1000}$Si(CH$_3$)$_2$OSi(OMe)$_3$, (EtO)$_3$SiO(Si(CH$_3$)$_2$O)$_{30-1000}$Si(CH$_3$)$_2$OSi(OEt)$_3$, (MeO)$_2$(Me)SiO(Si(CH$_3$)$_2$O)$_{30-1000}$Si(CH$_3$)$_3$, (MeO)$_2$(Me)SiO(Si(CH$_3$)$_2$O)$_{1-100}$Si(CH$_3$)$_2$(CH$_2$)$_3$O(CH$_2$CH(CH$_3$)O)$_{10-1000}$(CH$_2$)$_3$(Si(CH$_3$)$_2$O)$_{1-100}$Si(CH$_3$)$_2$(OSi(Me)(OMe)$_2$), (MeO)$_2$(Me)SiO(Si(CH$_3$)$_2$O)$_{3-500}$Si[O(Si(CH$_3$)$_2$O)$_{3-500}$Si(Me)(OMe)$_2$]$_3$ and (MeO)$_2$(Me)SiO(Si(CH$_3$)$_2$O)$_{3-500}$Si(CH$_3$)[O(Si(CH$_3$)$_2$O)$_{3-500}$Si(Me)(OMe)$_2$]$_2$.

The invention further provides compositions comprising organosilicon compounds (A) having organyloxy groups, and also comprising salt (C) formed from a base (C1) and from a phosphorus compound (C3) having a P=O group.

The organosilicon compounds (A) produced in the invention are preferably those having from 10 to 10,000 silicon atoms, particularly having from 100 to 2000 silicon atoms.

The organosilicon compounds (A) having organyloxy groups produced in the invention are in particular part of compositions that are crosslinkable by a condensation reaction.

The compositions of the invention can also comprise not only the organosilicon compounds (A) having organyloxy groups and the salt (C), but also base (C1) or phosphorus compound (C3), and also further constituents.

The compositions of the invention preferably comprise organosilicon compounds (A) having organyloxy groups, salt (C), optionally base (C1) or phosphorus compound (C3), component (B), and also one or more of the constituents (D), (F), (G), (G1), (H) and (I).

If the compositions of the invention or compositions produced in the invention are compositions that are crosslinkable by a condensation reaction, these comprise quantities that are preferably from 10 to 70 parts by weight of component (A), more preferably from 20 to 65 parts by weight, and in particular from 25 to 60 parts by weight, based in each case on 100 parts by weight of the entire crosslinkable mixture.

It is particularly preferable that the compositions of the invention are compositions that are crosslinkable by a condensation reaction, comprising (A) organosilicon compounds having organyloxy groups,
(B) organosilicon compounds having at least two organyloxy groups,
(C) salt,
optionally
(C1) base,
(D) organic solvent,
(F) catalyst,
(G) calcium carbonate,
optionally
(G1) other fillers,
optionally
(H) plasticizers and
optionally
(I) other constituents.

It is further particularly preferable that the compositions of the invention are compositions that are crosslinkable by a condensation reaction, comprising (A) organosilicon compounds having organyloxy groups,
(B) organosilicon compounds having at least two organyloxy groups,
(C) salt,
(C3) phosphorus compound,
optionally
(D) organic solvent,
(F) catalyst,
(G) calcium carbonate,
optionally
(G1) other fillers,
optionally
(H) plasticizers and
optionally
(I) other constituents.

It is preferable that salt (C) is
(TBDH)$^+$[(CH$_3$CH$_2$CH$_2$CH$_2$CH$_2$CH$_2$CH$_2$CH$_2$)P(=O)(OH)O$^-$],
(TBDH)$^+$[P(=O)(OH)$_2$O]$^-$,
(TBDH)$^+$[(CH$_3$CH$_2$CH$_2$CH$_2$CH(CH$_2$CH$_3$)CH$_2$O)P(=O)(OH)O$^-$],
(TMGH)$^+$[(CH$_3$CH$_2$CH$_2$CH$_2$CH$_2$CH$_2$CH$_2$CH$_2$)P(=O)(OH)O]$^-$,
(TMGH)$^+$[P(=O)(OH)$_2$O]$^-$,
(TMGH)$^+$[(CH$_3$CH$_2$CH$_2$CH$_2$CH(CH$_2$CH$_3$)CH$_2$O)P(=O)(OH)O]$^-$,
(DBUH)$^+$[(CH$_3$CH$_2$CH$_2$CH$_2$CH$_2$CH$_2$CH$_2$CH$_2$)P(=O)(OH)O]$^-$,
(DBUH)$^+$[P(=O)(OH)$_2$O]$^-$,
(DBUH)$^+$[(CH$_3$CH$_2$CH$_2$CH(CH$_2$CH$_3$)CH$_2$O)P(=O)(OH)O]$^-$,
Li$^+$[(CH$_3$CH$_2$CH$_2$CH$_2$CH$_2$CH$_2$CH$_2$CH$_2$)P(=O)(OH)O]$^-$,
Li$^+$[P(=O)(OH)$_2$O]$^-$ or
Li$^+$[(CH$_3$CH$_2$CH$_2$CH$_2$CH(CH$_2$CH$_3$)CH$_2$O)P(=O)(OH)O]$^-$, where 1,5,7-triazabicyclo[4.4.0]dec-5-ene is TBD, N,N,N',N'-tetramethylguanidine is TMG and 1,8-diazabicyclo[5.4.0]undec-7-ene is DBU.

The compositions of the invention can be any desired hitherto known types of crosslinkable compositions based on organosilicon compounds, for example single-component or two-component room-temperature-vulcanizable organopolysiloxane compositions. It is preferable that the compositions of the invention are crosslinkable single-component compositions.

The usual water content of air is sufficient for the crosslinking of the compositions of the invention or the compositions produced in the invention. The crosslinking of the compositions of the invention preferably takes place at room temperature. It can also, if desired, take place at temperatures higher or lower than room temperature, for example at from −5° to 15° C. or at from 30° to 50° C. and/or by means of water concentrations exceeding the normal water content of air.

The crosslinking is preferably carried out at a pressure from 100 to 1100 hPa, in particular at the pressure of the ambient atmosphere.

The present invention further provides moldings produced by crosslinking of the compositions of the invention or the compositions produced in the invention.

The compositions of the invention or the compositions produced in the invention can be used for any applications for which compositions which can be stored with exclusion of water and which crosslink on exposure to water at room temperature to give elastomers are useful.

The compositions of the invention or the compositions produced in the invention therefore have excellent suitability by way of example as sealing compositions for joints, inclusive of vertical joints, and similar cavities with gap width by way of example from 10 to 40 mm, e.g. in buildings, land vehicles, watercraft and aircraft, or as adhesives or putties, e.g. in window construction or in the production of aquaria or display cabinets, and also by way of example for the production of protective coverings inclusive of those for surfaces having long periods of exposure to fresh water or seawater, or of antislip coatings, or of elastomeric moldings, or else for insulation of electrical or electronic devices. The compositions produced in the invention are particularly suitable as sealing compositions for joints in the construction sector or for component joints, where these are subject to relatively stringent fire performance requirements.

The compositions produced in the invention have the advantage of good shelf life and low modulus.

The process of the invention has the advantage of permitting easy production of organosilicon compounds having organyloxy groups.

The process of the invention moreover has the advantage that even small quantities of preparation (C) permit, without additional heating, rapid production of organyloxy-terminated organosilicon compounds which can be used for the production of curable compositions.

The process of the invention has the advantage that the organosilicon compounds produced in the invention having organyloxy groups can be used immediately after production to produce crosslinkable compositions without prior isolation or downstream operations such as filtration or deactivation by high temperatures.

The process of the invention moreover has the advantage that there is practically no further change of viscosity after mixing (mixing viscosity); occurrence of additional problems caused by gradual viscosity increase or by viscosity increase at particular times, for example, are thus avoided.

Unless otherwise stated, all data relating to parts and percentages in the examples below relate to weight. Unless otherwise stated, the examples below are carried out at the pressure of the ambient atmosphere, i.e. at about 1000 hPa, and at room temperature, i.e. about 20° C., or at a temperature prevailing when the reactants are combined at room temperature without additional heating or cooling. All of the viscosity data mentioned in the examples relate to a temperature of 25° C.

The dynamic viscosity of the organosilicon compounds in the examples below is measured in accordance with DIN 53019. The procedure was preferably as follows: unless otherwise stated, the viscosity is measured at 25° C. by means of a "Physica MCR 300" rotary rheometer from Anton Paar. A coaxial cylinder measurement system (CC 27) with an annular measurement gap of 1.13 mm was used for viscosities of from 1 to 200 mPa·s, and a cone-and-plate measurement system (Searle system with measurement cone CP 50-1) was used for viscosities above 200 mPa·s. The shear rate is adjusted appropriately for the viscosity of the polymer (1 to from 99 mPa·s:100 s$^{-}$; from 100 to 999 mPa·s:200 s$^{-1}$; from 1000 to 2999 mPa·s:120 s$^{-1}$; from 3000 to 4999 mPa·s:80 s$^{-1}$; from 5000 to 9999 mPa·s:62 s$^{-1}$; from 10,000 to 12,499 mPa·s:50 s$^{-1}$; from 12,500 to 15,999 mPa·s:38.5 s$^{-1}$; from 16,000 to 19,999 mPa·s:33 s$^{-1}$ from 20,000 to 24,999 mPa·s:25 s$^{-1}$; from 25,000 to 29,999 mPa·s:20 s$^{-1}$; from 30,000 to 39,999 mPa·s:17 s$^{-1}$; from 40,000 to 59,999 mPa·s; 10 s$^{-1}$; from 60,000 to 149,999:5 s$^{-1}$; from 150,000 to 199,999 mPa·s:3.3 s$^{-1}$; from 200,000 to 299,999 mPa·s:2.5 s$^{-1}$; from 300,000 to 1,000,000 mPa·s:1.5 s$^{-1}$).

Once the temperature of the measurement system has been controlled to the measurement temperature, a three-stage measurement program is run, composed of an introductory phase, preshear, and viscosity measurement. The introductory phase involves stepwise shear rate increase within one minute to the shear rate stated above, which is dependent on the expected viscosity, and at which the measurement is to be made. As soon as this has been achieved, preshear is applied at constant shear rate for 30 s, then the viscosity is determined by carrying out 25 individual measurements for in each case 4.8 s, and the average value determined from these. The average value corresponds to the dynamic viscosity, which is stated in mPa·s.

Inventive Example 1

324.3 g of an α,ω-dihydroxypolydimethylsiloxane with dynamic viscosity 80,000 mPa·s, 180.0 g of an α,ω-trimethylsiloxypolydimethylsiloxane with dynamic viscosity of 1000 mPa·s, 9.8 g of methyltrimethoxysilane, 2.9 g of vinyltrimethoxysilane and 0.12 g of a 50% by weight solution of 1,5,7-triazabicyclo[4.4.0]dec-5-ene (available from Sigma-Aldrich Co., Germany) in methanol were intimately mixed for 10 minutes in a planetary dissolver with exclusion of moisture, 4.32 g of a 50% by weight solution of n-octylphosphonic acid in methyltrimethoxysilane were then added, and the mixture was stirred at 100 mbar for a further 5 minutes. 15.0 g of bis(ethylacetoacetato)diisobutoxytitanium (available as "Tyzor® IBAY" from Dorf Ketal Speciality Catalysts LLC, Stafford, USA) were then added to the mixture, which was then stirred at 100 mbar for a further 10 minutes. The mixture was then completed by adding 51.6 g of hydrophilic fumed silica with BET surface area 150 m$^2$/g (available as HDK® V15 from Wacker Chemie AG, Munich, Germany) and 612 g of stearic-acid-coated ground marble with median particle diameter (D50%) about 5.0 μm (available as "OMYABOND 520 FL" from OMYA, Cologne, Germany), and was homogenized at 100 mbar for 20 minutes. The finished mixture was then drawn off into commercially available polyethylene cartridges.

Product samples were tested as stated; table 1 shows the results.

Inventive Example 2

324.3 g of an α,ω-dihydroxypolydimethylsiloxane with dynamic viscosity 80,000 mPa·s, 180.0 g of an α,ω-trimethylsiloxypolydimethylsiloxane with dynamic viscosity of 1000 mPa·s, 9.8 g of methyltrimethoxysilane, 2.9 g of vinyltrimethoxysilane and 0.12 g of a 50% by weight solution of 1,5,7-triazabicyclo[4.4.0]dec-5-ene in methanol were intimately mixed for 10 minutes in a planetary dissolver with exclusion of moisture. 51.6 g of hydrophilic fumed silica with BET surface area 150 m$^2$/g (available as HDK® V15 from Wacker Chemie AG, Munich, Germany) and 612 g of stearic-acid-coated ground marble with median particle diameter (D50%) about 5.0 μm (available as "OMYABOND 520 FL" from OMYA, Cologne, Germany) were then added to this mixture, and the mixture was homogenized at 100 mbar for 20 minutes. The mixture was then completed by adding 15.0 g of bis(ethylacetoacetato) diisobutoxythtabnate and 4.32 g of a 50% by weight solution of n-octylphosphoric acid in methyltrimethoxysilane, and was stirred at 100 mbar for 5 minutes. The finished mixture was then drawn off into commercially available polyethylene cartridges. Product samples were tested as stated; table 1 shows the results.

Inventive Example 3

324.3 g of an α,ω-dihydroxypolydimethylsiloxane with dynamic viscosity 80,000 mPa·s, 180.0 g of an α,ω-trimethylsiloxypolydimethylsiloxane with dynamic viscosity of 1000 mPa·s, 9.8 g of methyltrimethoxysilane, 2.9 g of vinyltrimethoxysilane and 0.12 g of a 50% by weight solution of 1,5,7-triazabicyclo[4.4.0]dec-5-ene in methanol were intimately mixed for 10 minutes in a planetary dissolver with exclusion of moisture. 15.0 g of bis(ethylacetoacetato)diisobutoxytitanium were then added to the mixture, and the mixture was stirred at 100 mbar for a further 10 minutes. 51.6 g of hydrophilic fumed silica with BET surface area 150 $m^2/g$ (available as HDK® V15 from Wacker Chemie AG, Munich, Germany) and 612 g of stearic-acid-coated ground marble with median particle diameter (D50%) about 5.0 µm (available as "OMYABOND 520 FL" from OMYA, Cologne, Germany) were then added, and the mixture was homogenized at 100 mbar for 20 minutes. The mixture was then completed by adding 4.32 g of a 50% by weight solution of n-octylphosphonic acid in methyltrimethoxysilane, and stirred at 100 mbar for a further 5 minutes. The finished mixture was then drawn off into commercially available polyethylene cartridges.

Product samples were tested as stated; table 1 shows the results.

Inventive Example 4

The procedure described in inventive example 1 is repeated, except that 8.64 g of a 50% by weight solution of n-octylphosphonic acid in methyltrimethoxysilane were used instead of 4.32 g of same solution.

Product samples were tested as stated; table 1 shows the results.

Inventive Example 5

The procedure described in inventive example 4 is repeated, except that 0.06 g of 1,8-diazabicyclo[5.4.0]undec-7-ene (available from Sigma-Aldrich Co., Germany) was used instead of 0.12 g of a 50% by weight solution of 1,5,7-triazabicyclo[4.4.0]dec-5-ene in methanol.

Product samples were tested as stated; table 1 shows the results.

Inventive Example 6

The procedure described in inventive example 1 is repeated, except that 0.06 g of N,N,N',N'-tetramethylguanidine (available from Sigma-Aldrich Co., Germany) was used instead of) 0.12 g of a 50% by weight solution of 1,5,7-triazabicyclo[4.4.0]dec-5-ene in methanol.

Product samples were tested as stated; table 1 shows the results.

Inventive Example 7

The procedure described in inventive example 1 is repeated, except that 7.31 g of tris(trimethylsilyl) phosphate (available from Sigma-Aldrich Co., Germany) were used instead of 4.32 g of a 50% by weight solution of n-octylphosphonic acid in methyltrimethoxysilane.

Product samples were tested as stated; table 1 shows the results.

Inventive Example 8

The procedure described in inventive example 1 is repeated, except that 5.70 g of a mixture of mono- and di(2-ethylhexyl) phosphate (available from ABCR GMBH & CO. KG, Germany) were used instead of 4.32 g of a 50% by weight solution of n-octylphosphonic acid in methyltrimethoxysilane.

Product samples were tested as stated; table 1 shows the results.

Inventive Example 9

The procedure described in inventive example 1 is repeated, except that 2.14 g of a 50% by weight solution of methylphosphonic acid (available from ABCR GMBH & CO. KG, Germany) in methyltrimethoxysilane were used instead of 4.32 g of a 50% by weight solution of n-octylphosphonic acid in methyltrimethoxysilane.

Product samples were tested as stated; table 1 shows the results.

Inventive Example 10

The procedure described in inventive example 1 is repeated, except that 3.07 g of a 50% by weight solution of 1-butylphosphonic acid (available from ABCR GMBH & CO. KG, Germany) in methyltrimethoxysilane were used instead of 4.32 g of a 50% by weight solution of n-octylphosphonic acid in methyltrimethoxysilane.

Product samples were tested as stated; table 1 shows the results.

Inventive Example 11

The procedure described in inventive example 1 is repeated, except that 3.52 g of a 50% by weight solution of phenylphosphonic acid (available from Sigma-Aldrich Co., Germany) in methyltrimethoxysilane were used instead of 4.32 g of a 50% by weight solution of n-octylphosphonic acid in methyltrimethoxysilane.

Product samples were tested as stated; table 1 shows the results.

Inventive Example 13

The procedure described in inventive example 4 is repeated, except that 4.8 g of a 2% by weight solution of lithium hydroxide (available from Sigma-Aldrich Co., Germany) in methanol were used instead of 0.12 g of a 50% by weight solution of 1,5,7-triazabicyclo[4.4.0]dec-5-ene in methanol.

Product samples were tested as stated; table 1 shows the results.

Comparative Example 1

The procedure described in inventive example 1 is repeated, except that no 50% by weight solution of n-octylphosphonic acid in methyltrimethoxysilane was used.

Product samples were tested as stated; table 2 shows the results.

Comparative Example 3

The procedure described in inventive example 1 is repeated, except that 6.46 g of diisooctylphosphinic acid (available from Sigma-Aldrich Co., Germany) were used instead of 4.32 g of a 50% by weight solution of n-octylphosphonic acid in methyltrimethoxysilane.

Product samples were tested as stated; table 2 shows the results.

Comparative Example 5

The procedure described in inventive example 1 is repeated, except that 5.92 g of tributyl phosphate (available from Sigma-Aldrich Co., Germany) were used instead of 4.32 g of a 50% by weight solution of n-octylphosphonic acid in methyltrimethoxysilane.

Product samples were tested as stated; table 2 shows the results.

Comparative Example 6

The procedure described in inventive example 1 is repeated, except that 5.59 g of dibutyl butylphosphonate (available from Sigma-Aldrich Co., Germany) were used instead of 4.32 g of a 50% by weight solution of n-octylphosphonic acid in methyltrimethoxysilane.

Product samples were tested as stated; table 2 shows the results.

Comparative Example 7

The procedure described in inventive example 4 is repeated, except that 0.274 g of a ~1 molar solution of 1-tert-butyl-4,4,4-tris(dimethylamino)-2,2-bis[tris(dimethylamino)phosphoranylidenamino]2$\lambda$5,4$\lambda$5-catenadi(phosphazene) in hexane (available from Sigma-Aldrich Co., Germany) was used instead of 0.12 g of a 50% by weight solution of 1,5,7-triazabicyclo[4.4.0]dec-5-ene in methanol.

Product samples were tested as stated; table 2 shows the results.

Comparative Example 8

The procedure described in inventive example 1 is repeated, except that 0.155 g of zinc acetylacetonate hydrate (available from Merck, Germany) and 0.604 g of dibutylamine (available for purchase from Merck, Germany) were used instead of 0.12 g of a 50% by weight solution of 1,5,7-triazabicyclo[4.4.0]dec-5-ene in methanol.

Product samples were tested as stated; table 2 shows the results.

Comparative Example 9

The procedure described in inventive example 13 is repeated, except that no 50% by weight solution of n-octylphosphonic acid in methyltrimethoxysilane was used.

Product samples were tested as stated; table 2 shows the results.

Comparative Example 10

312.3 g of an α,ω-dihydroxypolydimethylsiloxane with viscosity 80,000 mPa·s, 9.8 g of methyltrimethoxysilane and 2.9 g of vinyltrimethoxysilane were intimately mixed for 5 minutes in a planetary dissolver with exclusion of moisture. 0.78 g of tetraethyl orthotitanate (available from ABCR GmbH & Co. KG, Germany) was then added, and stirring was continued. Once the mixture had become thickened, 15.6 g of methanol were added, and the mixture was stirred at 100 mbar for 30 minutes. High viscosity prevented further processing of the resultant mixture.

Product samples were tested as stated; table 2 shows the results.

Inventive Example 15

492 g of an α,ω-dihydroxypolydimethylsiloxane with dynamic viscosity 80,000 mPa·s, 184 g of an α,ω-trimethylsiloxypolydimethylsiloxane with dynamic viscosity 10 mPa·s, 10.3 g of a solution produced by mixing of 16.5 g of methyltrimethoxysilane, 33.0 g of vinyltrimethoxysilane, 0.250 g of 1,5,7-triazabicyclo[4.4.0]dec-5-ene (available from Sigma-Aldrich Co., Germany) and 1.0 g of 1,3-propanediol were intimately mixed for 10 minutes in a planetary dissolver with exclusion of moisture. 16.0 g of methyltrimethoxysilane, 14.4 g of an adhesion promoter produced by equilibrating 1 part by weight of 3-aminopropyltriethoxysilane with 1 part by weight of methyltriethoxysilane hydrolyzate with 37% by weight ethoxy content, 5.2 g of 3-aminopropyltrimethoxysilane and 2.40 g of a 50% by weight solution of n-octylphosphonic acid in methyltrimethoxysilane were then added, and the mixture was stirred for a further 5 minutes. 71 g of hydrophilic fumed silica with BET surface area 150 $m^2$/g (available as HDK® V15 from Wacker Chemie AG, Munich, Germany) were then added to the mixture, and the mixture was then stirred at 100 mbar for a further 10 minutes. The mixture was then completed by adding 2.3 g of a tin catalyst produced by reaction of 77% by weight of di-n-butyltin diacetate and 23% by weight of tetraethoxysilane (available as "Kat 416" from TIB Chemicals AG, Mannheim, Germany), and homogenized at 100 mbar for 5 minutes. The finished mixture was then drawn off into commercially available polyethylene cartridges.

Product samples were tested as stated; table 1 shows the results.

Comparative Example 12

The procedure described in inventive example 15 is repeated, except that 0.155 g of zinc acetylacetonate hydrate (available from Merck, Germany) and 0.604 g of dibutylamine (available for purchase from Merck, Germany) were used instead of 0.250 g of 1,5,7-triazabicyclo[4.4.0]dec-5-ene (available from Sigma-Aldrich Co., Germany) and 1.0 g of 1,3-propanediol. High viscosity prevented further processing of the resultant mixture.

Description of Test Methods

Before assessment of properties (skinning time, 100% modulus, tensile strength, Shore A hardness) by the test methods described below, product samples were first stored at 23° C. for 24 hours in cartridges sealed to exclude air and moisture.

A sample was moreover stored at 70° C. After the 14 days of preaging at 70° C. shown in tables 1 and 2, the samples were in turn then stored at 23° C. for 24 hours before assessment of properties. Properties (skinning time, 100% modulus, tensile strength, Shore A hardness) were then determined by the test methods described below.

Skinning time was determined at 50% relative humidity and 23° C. To this end, the surface of a freshly applied coating of composition was gently touched by the tip of a pencil of hardness HB at intervals of 3 minutes. The skinning time is the time at which composition no longer remains adhering on the tip of the pencil.

Shore A hardness in accordance with DIN 53505 was determined by producing test specimens of thickness 6 mm which were hardened for 7 days at relative humidity of 50% and temperature of 23° C. by reaction with moisture in the ambient air.

For determination of mechanical properties (100% modulus, tensile strength), skins of thickness 2 mm were coated onto polyethylene films and were peeled from the film after hardening for 1 day, and were suspended for a further 6 days in a manner that permitted approach of air from all sides, the total time for which the samples were hardened therefore being 7 days. Relative humidity here was adjusted to 50%, while the temperature was controlled to 23° C. In each case seven test specimens of type S2 in accordance with DIN 53504 were then punched out from these vulcanizate skins. The value stated here for 100% modulus and for tensile strength corresponds to the respective average value of the individual values noted.

Table 1 shows the results from the inventive examples; table 2 shows the results from the non-inventive comparative examples.

in a second step
admixing one or more phosphorus compounds (C3) having a P=O group with the resultant reaction mixture, and capable of salt formation with base (C1) wherein at least one phosphorus compound (C3) having a P=O group is selected from the group consisting of phosphorus compounds of the formula $$O=PR^{16}_m(OR^{17})_n(OH)_{3-(m+n)} \quad (VII),$$

where
m is 0 or 1,
n is 0, 1, 2 or 3,
m+n is 1, 2 or 3,
$R^{16}$ is an optionally substituted hydrocarbon moiety,
$R^{17}$ each is identical or different, and is an optionally substituted hydrocarbon moiety which
is optionally interrupted by heteroatoms, is a triorganosilyl moiety bonded by way of Si, is an organoalkoxysilyl moiety bonded by way of Si, or is a phosphate moiety bonded by way of P,

TABLE 1

|  | Pre-aging | Unit | IE1 | IE2 | IE3 | IE4 | IE5 | IE6 | IE7 | IE8 | IE9 | IE10 | IE11 | IE13 | IE15 |
|---|---|---|---|---|---|---|---|---|---|---|---|---|---|---|---|
| Skinning time | 1 day after production | [min] | 30 | 51 | 51 | 57 | 39 | 9 | 120 | 51 | 51 | 30 | 30 | 60 | 10 |
|  | 14 days 70° C. | [min] | 51 | 60 | 30 | 30 | 39 | 30 | 120 | 90 | 50 | 30 | 30 | 39 | 15 |
| Hardness | 1 day after production | [Shore A] | 22 | 21 | 23 | 24 | 22 | 23 | 15 | 21 | 26 | 25 | 26 | 25 | 20 |
|  | 14 days 70° C. | [Shore A] | 15 | 11 | 14 | 24 | 19 | 20 | 10 | 11 | 20 | 21 | 20 | 23 | 15 |
| 100% modulus | 1 day after production | [MPa] | 0.34 | 0.32 | 0.35 | 0.41 | 0.33 | 0.39 | 0.30 | 0.34 | 0.40 | 0.40 | 0.42 | 0.42 | 0.42 |
|  | 14 days 70° C. | [MPa] | 0.28 | 0.27 | 0.29 | 0.46 | 0.33 | 0.39 | 0.26 | 0.28 | 0.41 | 0.43 | 0.37 | 0.42 | 0.37 |
| Tensile strength | 1 day after production | [MPa] | 1.58 | 1.55 | 1.76 | 1.59 | 1.24 | 1.37 | 1.17 | 1.68 | 1.53 | 1.60 | 1.66 | 1.71 | 1.5 |
|  | 14 days 70° C. | [MPa] | 0.77 | 0.84 | 0.73 | 1.32 | 1.12 | 1.13 | 0.91 | 0.69 | 1.09 | 1.14 | 1.05 | 1.41 | 1.4 |

TABLE 2

|  | Pre-aging | Unit | CE1 | CE3 | CE5 | CE6 | CE7 | CE8 | CE9 | CE10 | CE12 |
|---|---|---|---|---|---|---|---|---|---|---|---|
| Skinning time | 1 day after Production | [min] | 21 | 90 | 21 | 39 | 120 | 21 | 30 | —² | —² |
|  | 14 days 70° C. | [min] | 120 | —¹ | —¹ | —¹ | 120 | 60 | —¹ | —² | —² |
| Hardness | 1 day after production | [Shore A] | 23 | 19 | 21 | 19 | 11 | 22 | 23 | —² | —² |
|  | 14 days 70° C. | [Shore A] | —¹ | —¹ | —¹ | —¹ | 4 | 7 | —¹ | —² | —² |
| 100% modulus | 1 day after production | [MPa] | 0.38 | 0.33 | 0.37 | 0.32 | 0.19 | 0.38 | 0.37 | —² | —² |
|  | 14 days 70° C. | [MPa] | —¹ | —¹ | —¹ | —¹ | 0.10 | 0.18 | —¹ | —² | —² |
| Tensile strength | 1 day after Production | [MPa] | 1.52 | 1.44 | 1.32 | 1.11 | 0.47 | 1.67 | 1.43 | —² | —² |
|  | 14 days 70° C. | [MPa] | —¹ | —¹ | —¹ | —¹ | 0.11 | 0.33 | —¹ | —² | —² |

¹paste, does not harden
²viscosity increase prevents compounding

What is claimed is:

1. A process for the production of compositions comprising organosilicon compounds having organyloxy groups, comprising:
in a first step
mixing at least one organosilicon compound (E) comprising at least one silanol group with at least one compound (B) comprising at least two organyloxy groups in the presence of at least one base (C1) selected from the group consisting of guanidines, amidines, lithium-containing bases, and the mixtures thereof, and reacting the mixture to form a resultant reaction mixture, and with the proviso that if $R^{17}$ is an optionally substituted hydrocarbon moiety, then m is equal to 0 and n is equal to 1 or 2, and wherein compound (B) is selected from the group consisting of methyltrimethoxysilane, dimethyldimethoxysilane, tetramethoxysilane, vinyltrimethoxysilane, methylvinyldimethoxysilane, methyltriethoxysilane, tetraethoxysilane, phenyltrimethoxysilane, n-butyltrimethoxysilane, isobutyltrimethoxysilane and tert-butyltrimethoxysilane, partial hydrolyzates of these and mixtures thereof.

2. The process of claim 1, wherein (C1) comprises one or more guanidines.

3. The process of claim 1, wherein mixing of the individual components both in the first step and in the second step takes place with exclusion of water from the surrounding atmosphere.

4. A process for the production of compositions comprising organosilicon compounds having organyloxy groups, comprising:

in a first step
mixing at least one organosilicon compound (E) comprising at least one silanol group with at least one compound (B) comprising at least two organyloxy groups in the presence of at least one base (C1) selected from the group consisting of guanidines, amidines, lithium-containing bases, and the mixtures thereof, and reacting the mixture to form a resultant reaction mixture, and in a second step
admixing one or more phosphorus compounds (C3) having a P=O group with the resultant reaction mixture, and capable of salt formation with base (C1) wherein at least one phosphorus compound (C3) having a P=O group is selected from the group consisting of phosphorus compounds of the formula $$O=PR^{16}{}_m(OR^{17})_n(OH)_{3-(m+n)} \quad \text{(VII),}$$

where
m is 0 or 1,
n is 0, 1, 2 or 3,
m+n is 1, 2 or 3,
$R^{16}$ is an optionally substituted hydrocarbon moiety,
$R^{17}$ each is identical or different, and is an optionally substituted hydrocarbon moiety which
is optionally interrupted by heteroatoms, is a triorganosilyl moiety bonded by way of Si, is an organoalkoxysilyl moiety bonded by way of Si, or is a phosphate moiety bonded by way of P,
with the proviso that if $R^{17}$ is an optionally substituted hydrocarbon moiety, then m is equal to 0 and n is equal to 1 or 2,
and wherein (C1) comprises at least one of 1, 5, 7-triazabicyclo[4.4.0]dec-5-ene, or 7-methyl-1,5,7-triazabicyclo[4.4.0]dec-5-ene.

5. The method of claim 1, wherein the phosphorus compound(s) C1 are added prior to incorporation of any filler into the composition.

6. The method of claim 1, wherein compounds (C1) and (C3) react to form a salt prior to incorporation of any filler.

7. The method of claim 1, further comprising adding one or more fillers selected from the group consisting of fillers (G1) which are not calcium carbonate.

* * * * *